United States Patent [19]
Bhatti et al.

[11] Patent Number: 5,509,275
[45] Date of Patent: Apr. 23, 1996

[54] DEHUMIDIFYING MECHANISM FOR AUTO AIR CONDITIONER

[75] Inventors: Mohinder S. Bhatti, Amherst; Prasad S. Kadle, East Amherst; James A. Baker, Williamsville, all of N.Y.

[73] Assignee: General Motors Corporation, Detroit, Mich.

[21] Appl. No.: 310,528

[22] Filed: Sep. 22, 1994

[51] Int. Cl.$^6$ .................................................. F25B 17/00
[52] U.S. Cl. .................................... 62/271; 62/94; 62/239; 165/7
[58] Field of Search ................................ 62/93, 94, 271, 62/239; 165/7

[56] References Cited

U.S. PATENT DOCUMENTS

| | | | |
|---|---|---|---|
| 1,814,028 | 7/1931 | Egli | 62/271 |
| 1,912,784 | 6/1933 | Miller et al. | 62/271 |
| 3,231,409 | 1/1966 | Munters | 117/46 |
| 3,377,225 | 4/1968 | Munters | 156/210 |
| 3,446,031 | 5/1969 | Chi et al. | 62/271 |
| 4,176,523 | 11/1979 | Rousseau | 62/2 |
| 4,982,575 | 1/1991 | Besik | 62/271 |
| 5,351,497 | 10/1994 | Lowenstein | 62/94 |

FOREIGN PATENT DOCUMENTS

| 572638 | 9/1977 | U.S.S.R. | 62/271 |
|---|---|---|---|

OTHER PUBLICATIONS

G. Denniston, "Desiccant Based Defog/Defrost System", Mar. 3, 1995, pp. 1–4.

Jorge Gualtieri, "Mercedes Unveils Efficient HVAC Unit for EVs", Automotive Industries, Jan., 1994, p. 52.

Matthew I. Wald, "Staying Cool and Saving the Ozone", The New York Times, Jun. 22, 1992, p.C1.

Primary Examiner—Henry A. Bennett
Assistant Examiner—William C. Doerrler
Attorney, Agent, or Firm—Patrick M. Griffin

[57] ABSTRACT

A dehumidifier works in conjunction with a vehicle air conditioner to reduce both condensation and cooling load on the evaporator. A unique desiccant wheel design incorporates end plates separated by desiccant tubes that allow a cooling cross flow to be sent through and between the wheel end plates, over the outside of, but sealed from the inside of, the tubes. As outside air passes through the inside half of the tubes and is dried, the released latent heat of vaporization is picked up by the cooling cross flow, which is pre heated. It continues on across the wheel, where it is turned around, heated farther by engine waste heat, and then sent through the inside of the other half of the tubes to regenerate the desiccant.

3 Claims, 3 Drawing Sheets

5,509,275

DEHUMIDIFYING MECHANISM FOR AUTO AIR CONDITIONER

This invention relates to automotive air conditioning systems in general, and specifically to a practical mechanism for drying the fresh, outside air that is pulled into the system before it reaches the evaporator.

BACKGROUND OF THE INVENTION

Refrigeration systems used in the food cold storage industry sometimes incorporate a desiccant mechanism known as a Munters wheel to dry the outside air that is pulled into the system upstream of the evaporator, so as to reduce frost formation. The wheel is a honeycomb structure coated with a desiccant material, such as a zeolite, that will absorb moisture from the outside air blown over it. One half of the wheel turns slowly through the outside air intake duct, continually picking up moisture. As it does so, it releases the latent heat of the moisture to sensible heat, warming the dried air as it passes through the wheel. Therefore, the evaporator is forced to cool air that has simply exchanged latent for sensible heat, with no net reduction in its effective cooling load. The other half of the wheel turns through another, separate duct adjacent to the intake duct, through which independently heated air is blown. The heated air passes through the other half of the wheel and is exhausted to the outside. This continually removes moisture from the other half of the desiccant wheel to regenerate it before it rotates back into the intake duct. The extra energy cost for desiccant regeneration is considered worthwhile because of the need for dried refrigerated air in such applications. It is also known, in the residential environment, to provide a metal "thermal" wheel, separate from and downstream from the desiccant wheel, to cool and remove some of the latent heat released by the desiccant. Such a system also relies entirely on water, to the exclusion of refrigerant, and is therefore not usable in a mobile application.

In automotive air conditioning systems, condensation of water vapor on the evaporator surface is typically relied on to dehumidify the air, but with all the attendant condensation problems of microbe growth and corrosion acceleration. However, some vehicle dehumidification systems have been proposed in which vehicle cabin or interior air is forcibly blown over a bed of desiccant and recirculated to the cabin. These systems operate independently of, and also subsequent to, the operation of the basic air conditioning (cooling) system, and represent a good deal of added cost and space. A practical, compact and energy efficient mechanism for dehumidification that worked in conjunction with the air conditioning system could be a decided advantage. It would, of course, provide drier cabin air, which is more comfortable. Furthermore, if the outside intake air could be dried upstream of the evaporator, it would substantially reduce evaporator condensation.

SUMMARY OF THE INVENTION

The invention provides a dehumidification system that does work in conjunction with the basic air conditioning system, and which dries the intake air upstream of the evaporator. A unique desiccant wheel configuration also provides for an independent cooling cross flow through the wheel, which removes released latent heat for a real net reduction in the evaporator cooling load.

The desiccant wheel includes a pair of circular, parallel end plates that are axially separated by a plurality of hollow, conductive metal tubes. Each end of each tube opens through an end plate, to which it is fixed, providing a rigid structure. The interior of each tube contains a layer of desiccant material disposed so as to be well exposed to air flow through the tube, but without blocking the air flow. The desiccant is of a type that adsorbs the moisture in air that is blown over it, releasing the latent heat of vaporization as sensible heat. The desiccant material also can be dried and desorbed if exposed to air that is independently heated to a threshold temperature, generally well above the expected ambient temperature of the outside air.

The desiccant wheel is located upstream of the evaporator, and turns slowly about its axis with about half of its area in each of a pair of side by side ducts, a feed duct and a regeneration duct. As a fresh air flow is passing through those tubes located in the feed duct, depositing moisture, a highly heated air flow, heated by waste engine heat, is passing in the opposite direction through those tubes located on the opposite side of the wheel, drying the desiccant. Unlike a conventional desiccant wheel, however, the heated regeneration air passes first between the wheel end plates, crossing both ducts perpendicular to the wheel axis before being looped back into the regeneration duct. In the process, the cross flow cools the tubes to remove the latent heat and thereby reduce the net cooling load on the evaporator. In addition, the cross flow air is pre heated before being further heated by an auxiliary, engine coolant fed heater to reach the regeneration temperature. So, the latent heat is not lost to the system. Using the wheel to provide its own cooling cross flow duct thereby increases total system efficiency as well as creating a compact package.

DESCRIPTION OF THE PREFERRED EMBODIMENT

These and other features of the invention will appear from the following written description, and from the drawings, in which.

Figure 1:
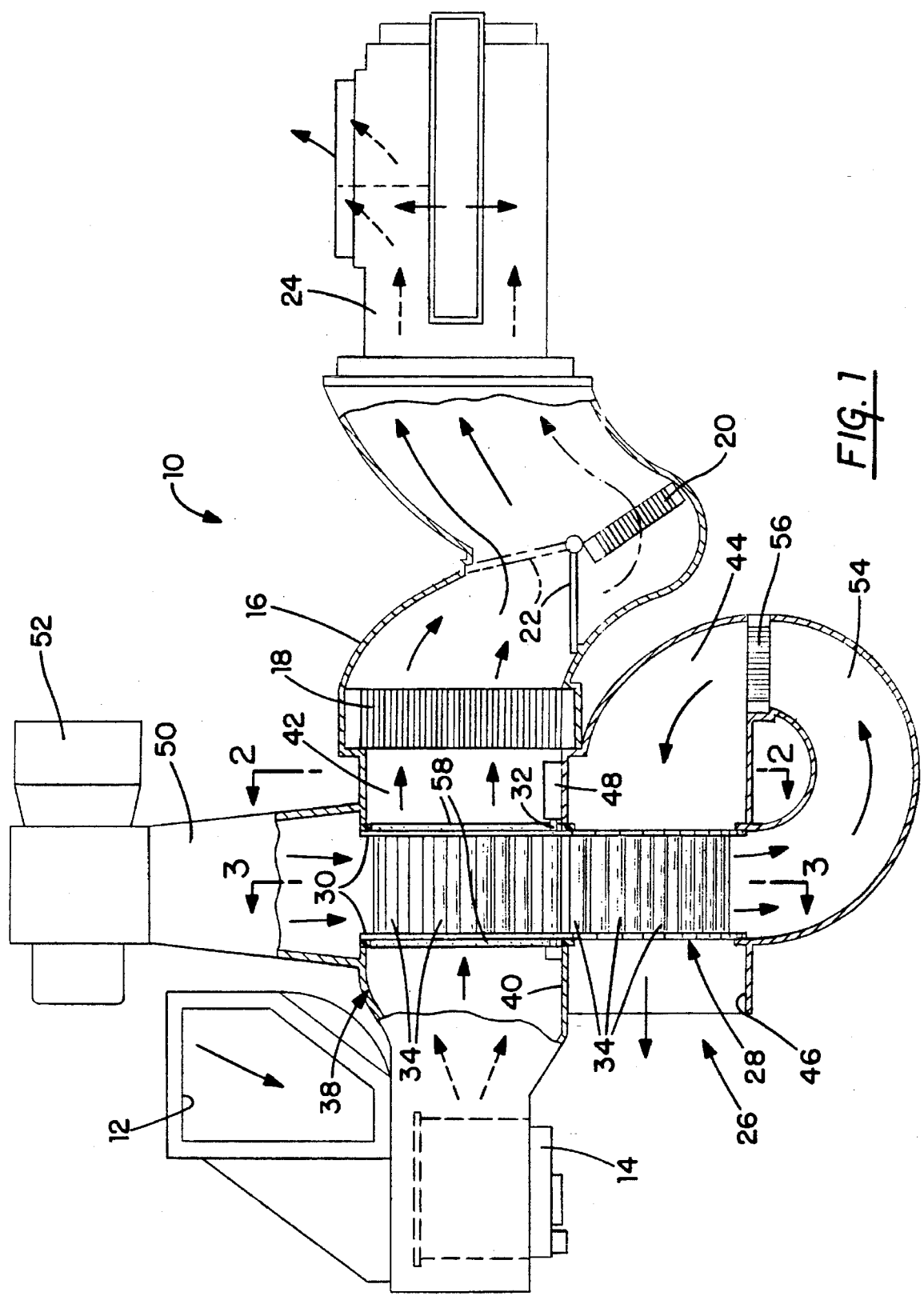
FIG. 1 shows system duct work, plenums and blowers, sectioned so as to show the wheel and various heat exchangers.

Referring first to FIG. 1, an automotive air conditioning and heating system (generally referred to as an HVAC system) is indicated generally at 10. HVAC system 10 has several conventional features, including a fresh or outside air inlet 12 through which air is pulled in by a main blower 14 and sent toward an HVAC housing 16, which contains an evaporator 18 and heater core 20. All inlet fresh air passes through evaporator 18, which may or may not be operative, while heater core 20 is typically run hot at all times. A flapper valve 22 diverts a selected percentage, or none, of the air through heater core 20, depending on the temperature desired. Air of the desired temperature is then sent through the interior duct work 24 to the vehicle occupants. When cooling is selected by the operator, generally during the summer months, the system compressor is operative and the evaporator 18 contains refrigerant capable of cooling the fresh air that passes through it. Such air, if untreated, will have a significant humidity, which condenses. The cooling load on evaporator 18 typically consists of a sensible component, corresponding to the work done just to cool the air, and a latent component related to moisture condensation and removal. The latent load alone generally represents about half of the total cooling load. The ability to dehumidify the inlet air would potentially enable a downsizing of evaporator 18. Just as significant, if not more so, condensation on evaporator 18, while it does dry the air before it reaches the vehicle interior, can lead to microbial growth and odor, as well as corrosion. The dehumidifying mechanism of the invention, indicated generally at 26, acts to dry the inlet fresh air intermediate the inlet 12 and evaporator 18.

Figure 4:
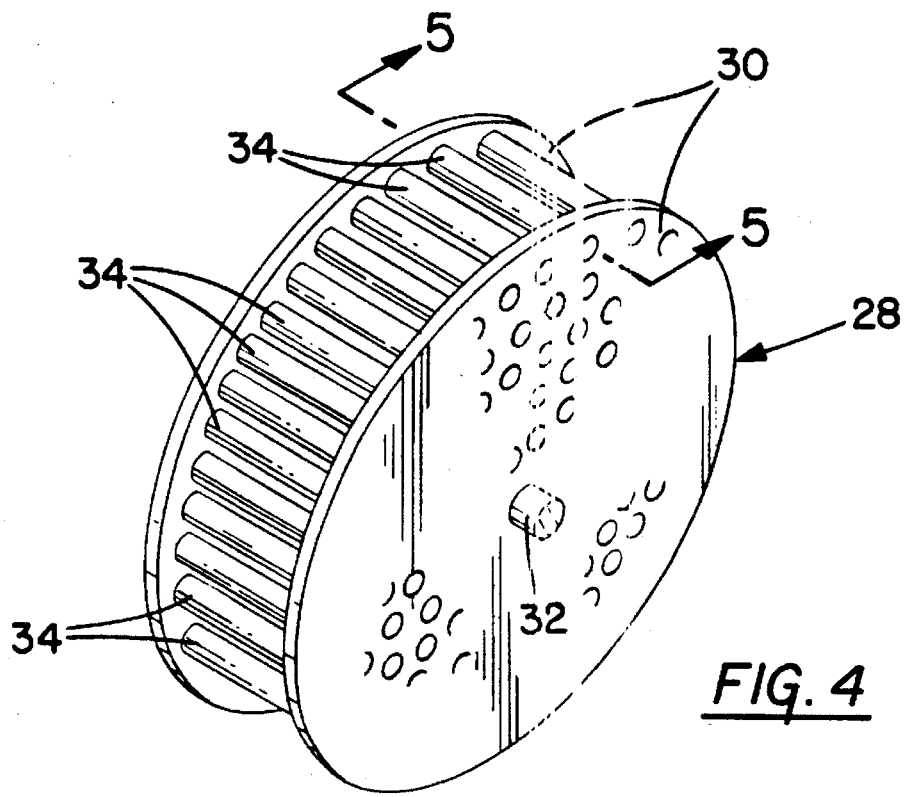
FIG. 4 is a perspective of the wheel alone.
Figure 5:
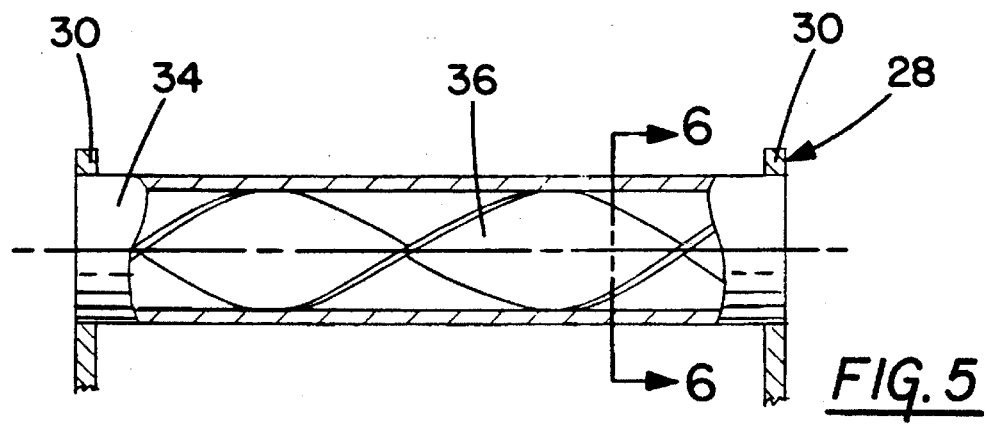
FIG. 5 is a cross section of one wheel tube taken along the line 5—5 of FIG. 4.
Figure 6:
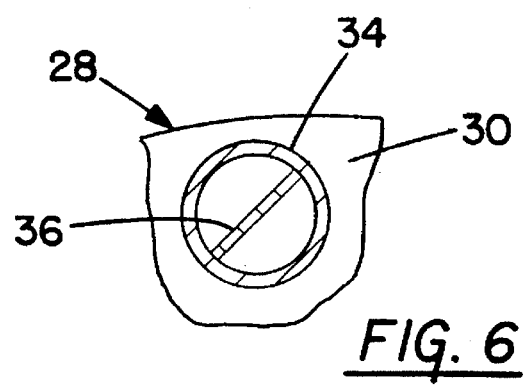
FIG. 6 is a cross section of one wheel tube taken along the line 6—6 of FIG. 5.

Referring next to FIGS. 4 through 6, the basic component of the invention is a desiccant wheel, indicated generally at 28. Wheel 28 has two circular end plates 30, cut from a durable, temperature resistant material such as aluminum or plastic. A center trunnion 32 extends axially from each end plate 30. The end plates 30 are maintained in an axially spaced, parallel relation by a plurality of open ended tubes 34, creating a cylinder approximately ten inches in diameter and four inches thick along the axis. Tubes 34 are formed of a heat conductive material, which would most likely be aluminum. Each end of each tube 34 opens through, and is secured to, a respective end plate 30, and runs parallel to the central axis established by the trunnions 32. Tubes 34 are sufficiently spaced that air can flow freely over their exterior, between the end plates 30, in a cross flow separate and distinct from flow through the interior of the tubes 34. Though not illustrated, the outside of the tubes 34 could be fitted with thin metal conductive fins, which would not block the cross flow, but would aid heat conduction out of the tubes 34. The interior of each tube 34 contains a twisted ribbon 36 consisting of, or layered with, a desiccant material of a commercially available type, such as zeolite. As such, tube 34 is not blocked, and can pass air freely, though the air would be thoroughly exposed to the surface of ribbon 36 en route. The desiccant material would be the type which adsorbs moisture in an exothermic manner, releasing heat. The moisture adsorption process forms a complex molecule with the adsorbed water, releasing the so called standard heat of association, which is equivalent to water's latent heat of vaporization, or 972 Btu/lb$_m$. Such a desiccant material also gives up moisture in an endothermic fashion, when exposed to air heated above a sufficient threshold, generally about 150–160 degrees Fahrenheit. Wheel 28 and the rest of the mechanism, described below, take advantage of this inherent property of the desiccant material.

Figure 2:
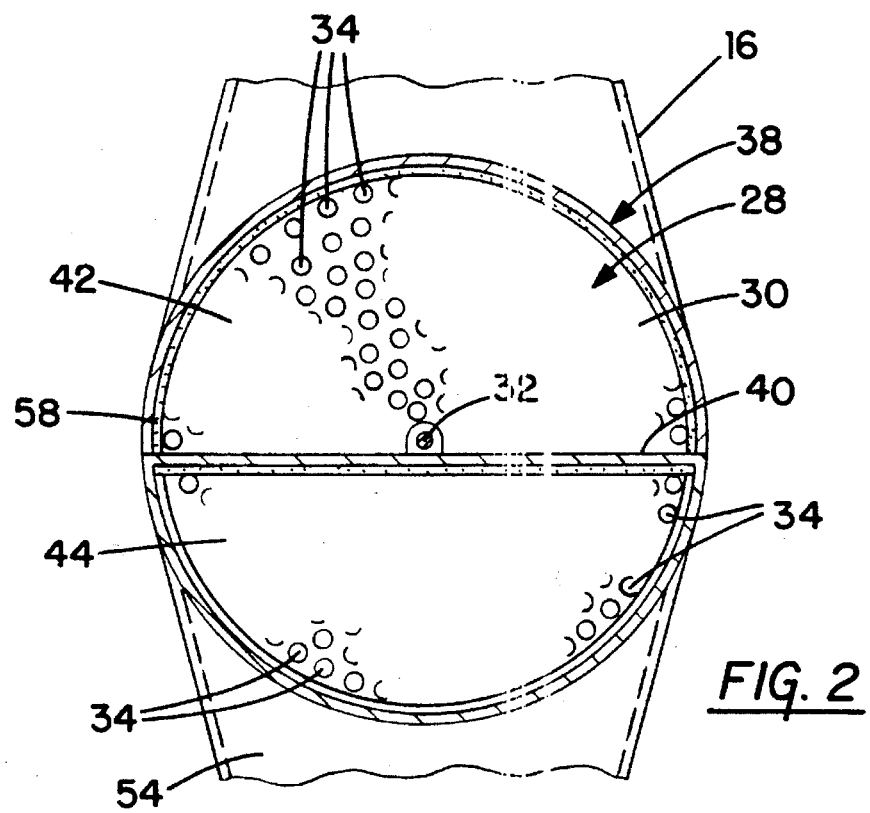
FIG. 2 is a cross section taken along the line 2—2 of FIG. 1.
Figure 3:
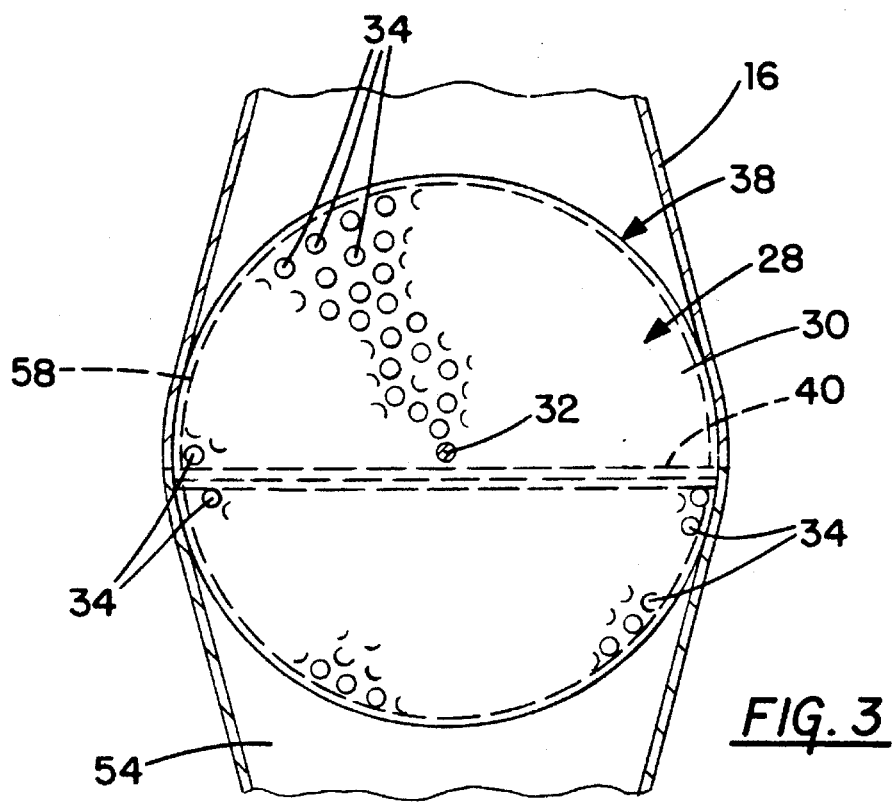
FIG. 3 is a cross section taken along the line 3—3 of FIG. 1.

Referring next to FIGS. 1–3, wheel 28 is closely radially contained within a cylindrical rim 38, located upstream of evaporator 18, which is divided by a partition wall 40. Wall 40 thereby divides rim 38 approximately in half into a feed duct 42, into which fresh air inlet 12 opens upstream of wheel 28, and an adjacent regeneration duct 44 with an outside exhaust port 46 that lies downstream of wheel 28. Even though inlet 12 and exhaust port 46 lie on the same side of wheel 28, one is upstream, and the other downstream thereof, because the directions of air flow in the side by side ducts 42 and 44 are opposed, as described farther below. Wheel 28 is supported on partition 40 by its' trunnions 32, and is rotated slowly through a close fitting slot in partition 40 by a servo motor 48, at a slow speed of about one RPM. The axis of wheel 28 lies to one side of wall 40, within the feed duct 42, so as to put motor 48 in a cooler air stream. Basically, however, at any point in time, a roughly equal number of tubes 34 are turning through each duct 42 and 44. Rim 38 also supports a cross flow of air, perpendicular to the opposite flows through ducts 42 and 44, by virtue of a unique cooperation with the wheel end plates 30. On one side of wheel 28, a cross flow plenum 50 opens through the feed duct side of rim 38, between the wheel end plates 30. A cross flow blower 52 sends air (which may, or may not, be all fresh or ambient air, as described further below) independently through cross flow plenum 50 and in between the end plates 30. On the opposite side of wheel 28, a return plenum 54 opens through the regeneration duct side of rim 38, looping around ninety degrees and merging back into the regeneration duct 44. All air that exits the return plenum 54 passes first through an auxiliary heater 56, which is fed by the same hot engine coolant that feeds the heater core 20. As wheel 28 turns, there is a rolling interface between the edges of the end plates 30, the rim 38, and the inlets into the cross flow plenum 50 and return plenum 54. There is also a close fitting, moving interface between the outer surfaces of the wheel end plates 30 and the slot through the partition wall 40. These interfaces are held closely enough to prevent significant air interchange. In addition, if desired, rubbing seals may be added, as shown at 58, to further reduce air exchange at any or all of the structural interfaces between moving parts.

Referring again to FIG. 1, the operation of the invention is described. It is inherently somewhat difficult to describe a dynamic operation that consists of several countervailing processes that reach an equilibrium, since only one of the various processes can be described at a time. It should be kept in mind that all the processes described individually here in fact are occurring simultaneously and continually. The flow through the feed duct 42 is described first. Humid outside air at ambient temperature is pulled in by the main blower 14 and sent into feed duct 42. It hits a wheel end plate 30 and is forced through those wheel tubes 34 that are on the feed duct side of partition 40, which may be referred to as the adsorbing tubes 34. The adsorbing tubes 34 will have just been through a thermal regeneration process, described below, which leaves the desiccant material on the ribbons 36 dry and capable of exothermically adsorbing water vapor. As this occurs, the heat that is released (latent heat described above) tends to raise the temperature of the air passing through the adsorbing tubes 34, as well as the wall of the tubes 34 themselves. This process is aided if the substrate ribbon is itself conductive to the wall of tube 34. This released heat would, in the absence of some countervailing process, exit the tubes 34 and reach the evaporator 18. In that case, evaporator 18, while it would face a smaller latent load, would only face a correspondingly greater sensible load. Here, however, air forced through the cross flow plenum 50 by cross flow blower 52 is also continually bathing the outside of all of the tubes 34, including the adsorbing tubes 34. The cross flow air is cooler, at least at ambient temperature. In addition, it would be possible to supply the cross flow blower 52, at least partially, with some or all of the waste cabin air that is continually vented from the vehicle interior as conditioned outside air is blown in, and which would be cooler and drier than ambient air. In either case, the cross flow air will be cool enough to be capable of removing much of the latent heat that is released. Consequently, the air that does eventually reach evaporator 18 will not have simply traded latent for sensible heat, as it would have without the cooling cross flow. Evaporator 18 will face less total cooling load in addition to experiencing much less condensation.

Still referring to FIG. 1, the cooling cross flow continues across regeneration duct 44, still confined between the rolling wheel end plates 30, and enters return plenum 54. The cross flow air, by this point, is warmed or preheated by having removed the latent heat as described above, as well as other heat described below. It is heated even further when it is looped around and into the regeneration duct 44, passing first through the auxiliary heater 56. The temperature of auxiliary heater 56 may easily reach between 170 to 180 degrees Fahrenheit, more than adequate to reach the desiccant regeneration temperature, and has the capacity to highly heat the cross flow air passing through it, just as the heater core 20 would. The now highly heated cross flow air then enters regeneration duct 44 and passes through the interior of the "wet" or desorbing tubes 34, that is, those tubes then on the regeneration duct side of partition 40. The hot air drives out and desorbs the previously adsorbed water from the ribbons 36, which is exhausted through port 46. Now, it will be recalled that a cooler cross flow is continually flowing over the outside of all of the tubes 34, including the desorbing tubes 34. This will tend to cool the hot air passing through them. However, the auxiliary heater 56 will be able to heat the regeneration air hot far enough above the regeneration threshold temperature that the cooling cross flow should not be able to lower it below that threshold. Then, too, although the cross flow will cool the desorbing tubes 34, the heat removed is not lost to the system, since it only serves to further preheat the air prior to passing through auxiliary heater 56. The net effect on the desorbing tubes 34 should be marginal.

The equilibrium temperatures that will be reached at any point in the system will vary in each particular case, depending on ambient temperature, air flow rates, the existing humidity, etc, and are not generalized here. Some general considerations that would assure successful operation in any case can be noted, however. One key to successful operation is that a sufficient cross flow rate be provided by the blower 52 to cool the adsorbing tubes 34 enough to remove latent heat, a task that will be heightened somewhat by the fact that those tubes 34 just turning through from the regeneration duct 44 will still be hot. A cross flow blower 52 similar in capacity to the main blower 14 should be able to send a very high cooling flow rate between the wheel end plates 30. This process would be aided, as noted above, if already cooled and dried waste air from the vehicle cabin vent were fed to cross blower 52. Another key is that the auxiliary heater 56 should have enough power to elevate the cross flow air to and above the threshold regeneration temperature and keep it there as it desorbs. There is generally more than sufficient high temperature coolant available from a vehicle engine cooling jacket, especially in the summer months. Furthermore, it would be possible to by pass all such flow from the standard heater core 20 to the auxiliary heater 56, though it would not likely be necessary. Therefore, the mechanism 26 of the invention is particularly suited to the vehicle environment, with its excess engine heat, and its already cool interior vent air. These two resources, previously considered simple waste to be dumped through the engine cooling radiator and the vehicle cabin vent valve, are not available in a residential cooling system, which also does not face the packaging constraints of a vehicle environment.

The embodiments of the invention in which an exclusive property or privilege are claimed are defined as follows:

1. A mechanism for continually dehumidifying the outside air that is forcibly drawn into a vehicle air conditioning system so as to reduce the potential for moisture condensation on a cooler heat exchanger, said vehicle having a source of engine waste heat, comprising, a desiccant wheel including a pair of parallel circular end plates spaced axially apart by a plurality of hollow, heat conductive tubes running axially through said end plates generally perpendicular to said plates and parallel to one another, each tube opening through each of said end plates and containing a layer of desiccant material capable of exothermic moisture adsorption and endothermic moisture desorption and disposed with the interior of said tube so as to be exposed to, but still allow, air flow through the interior of said tube, said heat conductive tubes also being sufficiently spaced from one another so as to allow free air flow over their exterior and radially across said wheel between said end plates, a feed duct divided from a side by side regeneration duct by a partition wall to which said wheel is rotatably mounted so as to place a portion of said wheel robes in each duct, a cross flow plenum into which air is forcibly drawn independently from said feed duct and opening through said feed duct between said wheel end plates, a return plenum having opening through said regeneration duct between said wheel end plates and running from said return plenum inlet to said regeneration duct upstream from said wheel, and, an auxiliary heater in said regeneration duct that draws heat from said source of waste heat and is capable of raising the temperature of air passing therethrough to the necessary moisture desorption temperature, whereby, outside air at ambient temperature and humidity is drawn into said outside air inlet and is forced axially through said wheel and through the interior of those wheel tubes located on the feed duct side of said partition, thereby giving up moisture and latent heat at a higher temperature, while simultaneously outside air at ambient temperature is independently drawn forcibly through said cross flow plenum and across the exterior of the wheel tubes while confined between said wheel end plates, thereby cooling and removing heat from those tubes located on the feed duct side of said partition and cooling the air passing through the interior thereof before crossing both ducts and entering into said return plenum, after which said heated air flows across said auxiliary heater and through the interior of those tubes located on the regeneration duct side of said partition, thereby removing moisture, before exiting said exhaust port.

2. A mechanism for continually dehumidifying the outside air that is forcibly drawn into an air conditioning system so as to reduce the potential for moisture condensation on a cooler heat exchanger, said vehicle having a source of engine waste heat, comprising, a desiccant wheel including a pair of parallel, equal diameter, circular end plates spaced axially apart by a plurality of hollow, heat conductive tubes running through said end plates generally perpendicular to said plates and parallel to one another, each tube opening through each of said end plates and containing a layer of desiccant material capable of exothermic moisture adsorption and endothermic moisture desorption and disposed with the interior of said tube so as to be exposed to, but still allow, air flow through the interior of said tube, said heat conductive tubes also being sufficiently spaced from one another so as to allow free air flow over their exterior and radially across said wheel between said end plates, a bifurcated wheel enclosure upstream from said heat exchanger and having a continuous cylindrical rim surrounding said wheel with close radial clearance and within which said wheel is supported for slow powered rotation about its axis, said duct having a partition wall generally perpendicular to said wheel end plates with a wheel slot through which said wheel turns with close clearance, said partition wall being located just to one side of said axis so as to divide said wheel enclosure rim into a feed duct on one side with an outside air inlet upstream from said wheel and a regeneration duct on the other side with an exhaust port downstream from said wheel, a cross flow plenum into which air is forcibly drawn independently from said feed duct and opening through said feed duct between said wheel end plates, a return plenum having an opening through said regeneration duct between said wheel end plates and running from said return plenum inlet to said regeneration duct upstream from said wheel, and, an auxiliary heater in said regeneration duct that draws heat from said source of waste heat and is capable of raising the temperature of air passing therethrough to the necessary moisture desorption temperature, whereby, outside air at ambient temperature and humidity is drawn into said outside air inlet and is forced axially through said wheel and through the interior of those wheel tubes located on the feed duct side of said partition, thereby giving up moisture and latent heat at a higher temperature, while simultaneously air is independently drawn forcibly through said cross flow plenum and across the exterior of the wheel tubes and confined between said wheel end plates, thereby cooling and removing heat from those tubes located on the feed duct side of said partition and cooling the air passing through the interior thereof before crossing both ducts and entering into said return plenum, after which said heated air flows across said auxiliary heater and through the interior of those tubes located on the regeneration duct side of said partition, thereby removing moisture, before exiting said exhaust port.

3. For use in an air conditioning dehumidification system of the type in which humid outside air is fed through one duct to be dried by a desiccant material and heated air is fed through a side by side duct to regenerate said desiccant material, a desiccant wheel, comprising, a desiccant wheel including a pair of parallel, equal diameter, circular end plates spaced axially apart by a plurality of hollow, heat conductive tubes running axially through said end plates generally perpendicular thereto and parallel to one another, each tube opening through each of said end plates and containing a layer of desiccant material capable of exothermic moisture adsorption and endothermic moisture desorption and disposed with the interior of said tube so as to be exposed to, but still allow, air flow through the interior of said tube, said heat conductive tubes also being sufficiently spaced from one another so as to allow free air flow over their exterior and radially across said wheel between said end plates, whereby said wheel may be turned through said ducts while simultaneously an independent cross flow of air may be forced through said wheel between said end plates to cool said tubes.

* * * * *